United States Patent
Figueroa

(12) 
(10) Patent No.: US 6,567,935 B1
(45) Date of Patent: May 20, 2003

(54) PERFORMANCE LINKING METHODOLOGIES

(75) Inventor: Timothy Figueroa, Aurora, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/470,353

(22) Filed: Dec. 22, 1999

(51) Int. Cl.⁷ .................................. H02H 3/05
(52) U.S. Cl. ........................................ 714/37
(58) Field of Search ................. 714/57, 20–48

(56) References Cited

U.S. PATENT DOCUMENTS

| | | | | |
|---|---|---|---|---|
| 4,108,360 A | * | 8/1978 | Beismann et al. | 714/37 |
| 5,661,668 A | * | 8/1997 | Yemini et al. | 702/186 |
| 5,740,354 A | * | 4/1998 | Ben-Natan et al. | 714/45 |
| 5,774,645 A | * | 6/1998 | Beaujard et al. | 714/25 |
| 5,805,785 A | * | 9/1998 | Dias et al. | 714/4 |
| 6,226,760 B1 | * | 5/2001 | Burkhardt et al. | 714/33 |
| 6,279,124 B1 | * | 8/2001 | Brouwer et al. | 709/328 |
| 6,401,217 B1 | * | 6/2002 | Clark et al. | 714/15 |

* cited by examiner

Primary Examiner—Robert Beausoliel
Assistant Examiner—Gabriel Chu
(74) Attorney, Agent, or Firm—Brooks & Kushman P.C.

(57) ABSTRACT

In accordance with the above object and other objects of the present invention a method for linking a performance of a mixed hardware and software system a system failure is provided. The method includes identifying a plurality of physical hardware in the mixed system, determining a plurality of software applications in the mixed system, classifying a plurality of software processes in the mixed system, establishing a plurality of collection points for monitoring the operation of each of the physical hardware, software applications, and software processes, creating a physical grid wherein the physical grid indicates a relationship between the subsystem and the software, creating a logical grid wherein the logical grid indicates a relationship between the software applications and the software processes, combining the physical and logical grids to obtain the relationship between the subsystem and the processes, and utilizing the combined grid to link a loss in functionality to one of a subsystem failure and a process failure.

8 Claims, 5 Drawing Sheets

| PROCESSES | AIN | DRY | ECF | ISDN | LNP | FASTOE | PCSW | POTS | PCS | RCC | IMA | CIT | FASTPICS | RSS |
|---|---|---|---|---|---|---|---|---|---|---|---|---|---|---|
| INFPRIA | | | | | | | | 09 | | | | | | |
| INFPRIB | 09 | | | | 09 | 09 | | | | | | | | |
| INFPRIC | | 09 | | 09 | | | 09 | | | | | | 09 | 09 |
| PCM | | | | | | | | | 09 | 09 | | | | |
| RCM | | | | | | | 09 | | | | | | | |
| GCM | | | | | | | | | | | | | | |
| FCM | | | | | | | | 09 | | | | | | |
| DBCPOTS | | | | | | | | 09 | | | | | | |
| DBCAIN | | | | | | | | | | | | | | |
| RTR_ISDN | | | | | | | | | | | | | | |
| RTR_PRIA | | | | | 09 | 09 | 09 | | 09 | 09 | 09 | | 09 | |
| RTR_PRIB | | | | 09 | | | | | | | | | | |
| RTR_PRIC | | | | | | | | | | | 09 | | | |
| DBC_ELMO | | | | | | | | | | | | | | |
| ICMA | | | | | | | | | | | | 09 | | |
| ICMB | | | | | | 09 | | | | 09 | | | | |
| ICMC | | 09 | 09 | | | | | | | | | | | |
| ICMD | | | | | | | | | 09 | | | | | |
| ICME | | | | | | | | | | | 09 | | | |
| IFMF | | | | | | | | | | | | | | |
| PROC200 | | | | 09 | 09 | | | 09 | | | | | | |
| PROC300 | | | | 09 | 09 | | | 09 | | | | | | |
| MAR_CTRL | | | | 09 | 09 | | | 09 | | | | | | |
| RES_CTRL | | | | | | | | | | | | | | |
| BC_SERV | | 09 | | | | | | | | | | | | |
| MOI | | 05 | 05 | 05 | 05 | | | 05 | | | | | | |
| INFO_SOL_SRV | 1 | 1 | 1 | 1 | 1 | | | 1 | | | | | | |

Fig. 4

PERFORMANCE LINKING METHODOLOGIES

TECHNICAL FIELD

This invention relates to systems and methods for determining the root cause of a failure in a mixed hardware and software system. The mixed hardware and software systems include computer related hardware components, software applications, and processes any of which are susceptible to failing and causing varying levels of loss in functionality of the system.

BACKGROUND ART

With the continuing push to automate existing business processes dependency on these new automated processes increases. Many companies and users rely on the continued operation of these automated systems, thus when an outage occurs it becomes critically important to quickly diagnosis where the fault is in the automated system and what impact that fault has on the various components and subcomponents of the automated system. Typically, an automated system comprises many components and subcomponents of which each may be designed, installed and maintained by different suppliers. It is readily apparent from the interdependency of the system components and subcomponents that it becomes increasingly difficult to determine which supplier is responsible for a failure and what degree of damage the failure has caused.

Conventional diagnostic methods and systems are capable of reporting overall application failures and specific subsystem failures. However, such conventional diagnostic systems are unable to report the impact a particular application or subsystem failure has on other applications and subsystems within the overall system. Generally, suppliers of the subsystems and applications enter into agreements with companies who own the entire system to maintain their respective components and subcomponents. These agreements specify when a failure occurs the supplier of the subsystems or applications will get the subsystem or application up and running in a specified time. Without a tool to track a system outage and link the outage to a specific subsystem or application failure it becomes exceedingly difficult to hold suppliers accountable for the system outage. Thus, the company is left to shoulder the entire financial burden caused by the system outage.

Therefore, a need exists for a system and method which is capable of linking a hardware and software system outage to a specific process, application, and/or hardware subsystem failure. The system and method should also be capable of categorizing the impact on the overall system. For example, the system and method should report whether the hardware and software system is undergoing a complete outage, a partial outage, or a functional system degradation.

DISCLOSURE OF INVENTION

Accordingly, it is an object of the present invention to provide a system and method for linking a system performance to one of a subsystem and software failure.

In accordance with the above object and other objects of the present invention a method for linking a performance of a mixed hardware and software system to a system failure is provided. The method includes identifying a plurality of physical hardware components in the mixed system, determining a plurality of software applications in the mixed system, classifying a plurality of software processes in the mixed system, establishing a plurality of collection points for monitoring the operation of each of the physical hardware components, software applications, and software processes, creating a physical grid wherein the physical grid indicates a relationship between the subsystem and the software, creating a logical grid wherein the logical grid indicates a relationship between the software applications and the software processes, combining the physical and logical grids to obtain the relationship between the subsystem and the processes, and utilizing the combined grid to link a loss in functionality to one of a subsystem failure and a process failure.

In accordance with another aspect of the present invention a system for linking a performance of a mixed subsystem and software system to a system failure is provided. The system includes a plurality of subsystems in the mixed system, a plurality of software applications in the mixed system, a plurality of software processes in the mixed system, a plurality of collection points for monitoring the operation of each of the physical subsystem, software applications, and software processes, a physical grid wherein the physical grid indicates a relationship between the subsystem and the software, a logical grid wherein the logical grid indicates a relationship between the software applications and the software processes, and a combined grid created by combining the physical and logical grids to obtain the relationship between the subsystem and the processes, wherein the combined grid is used to link a loss in functionality to one of a subsystem failure and a process failure.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 4 is a perspective view of a combined weighted grid used to determine the impact of a component failure within the mixed hardware and software system, according to the present invention.

BEST MODE FOR CARRYING OUT THE INVENTION

Figure 1:
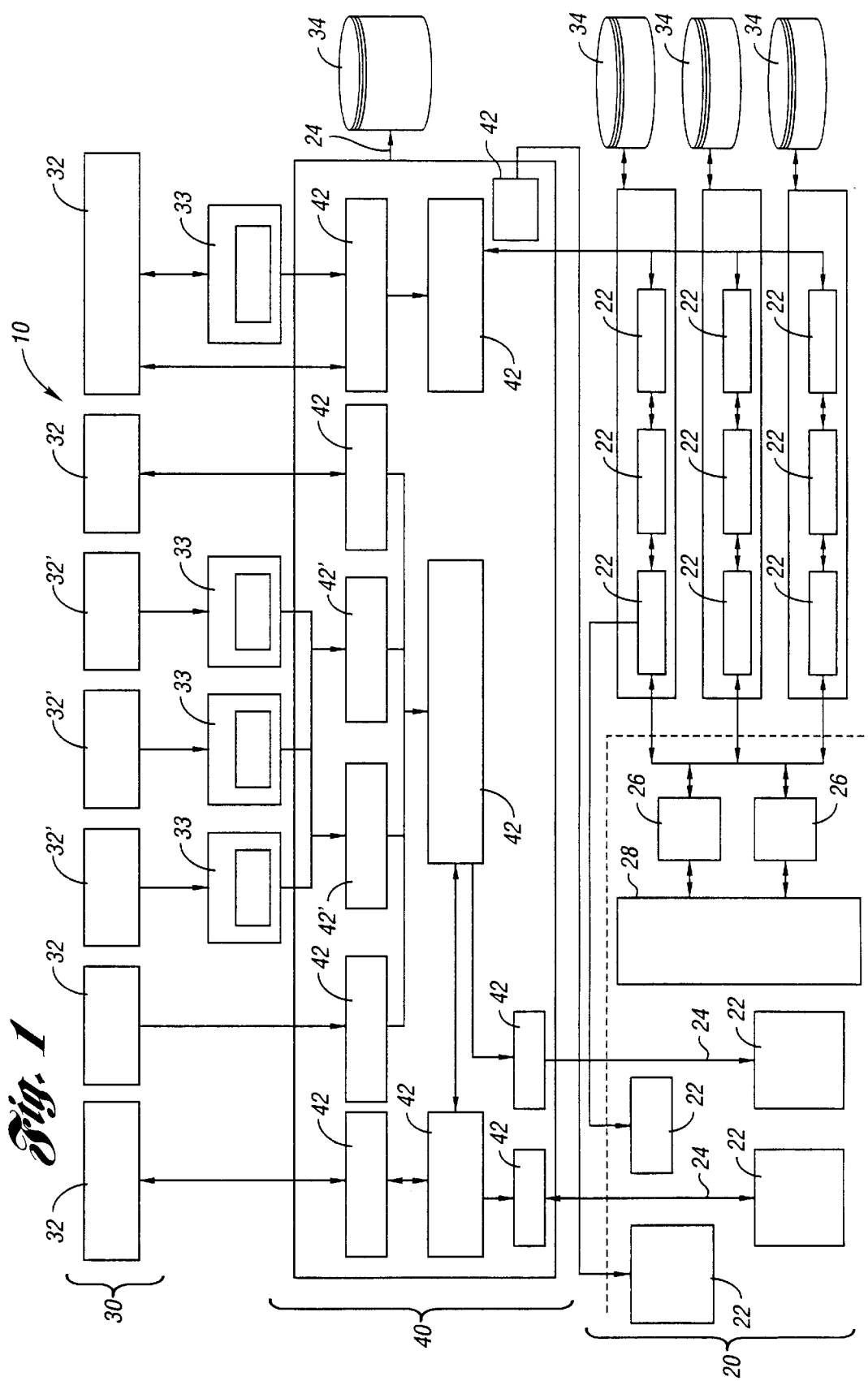
FIG. 1 is a block diagram of a mixed computer hardware and software system, according to the present invention.

Referring now to FIG. 1, a system 10 having physical componentry such as computers 22, connectors, wiring 24, rotors 26, switches 28 and the like as well as logical components such as software applications 32 and 33, databases 34 and processes 42 are illustrated. The users of system 10 access the system through a plurality of applications 30 each of which utilize a plurality of processes 40.

The processes 40 operate on hardware subsystems 20 to carry out the particular task requested by users of system 10. In complex computer hardware and software systems such as system 10 where a plurality of applications depend on the continued operation of a plurality of processes 40 and a plurality of hardware components 20 it becomes extremely important to quickly diagnosis and correct a component or subcomponent failure within system 10. As readily apparent from FIG. 1 the interdependency of applications on processes and processes on other processes and hardware components can cause a partial or full loss in functionality of system 10.

The arrangement of application, processes and hardware components, shown in FIG. 1, is merely for explanatory purposes only and the present invention may be used with other software and hardware arrangements. For example, a set of software applications 32 communicate directly with a plurality of processes 42 running on computers 22, while another set of applications 32' communicate with software applications 33 which are connected to processes 42'. The arrangement of the software and hardware within system 10 is not important. What is important is that there is an interdependency between applications 30, processes 40 and hardware components 20. As illustrated in FIG. 1, if a process 42 fails certain applications 32 will fail. Similarly, if a hardware component such as a computer 22 fails certain processes and applications will fail. The present invention provides a method for diagnosing, tracking, and quantifying a particular failure for determining the impact of the failure on the rest of the system.

Figure 2:
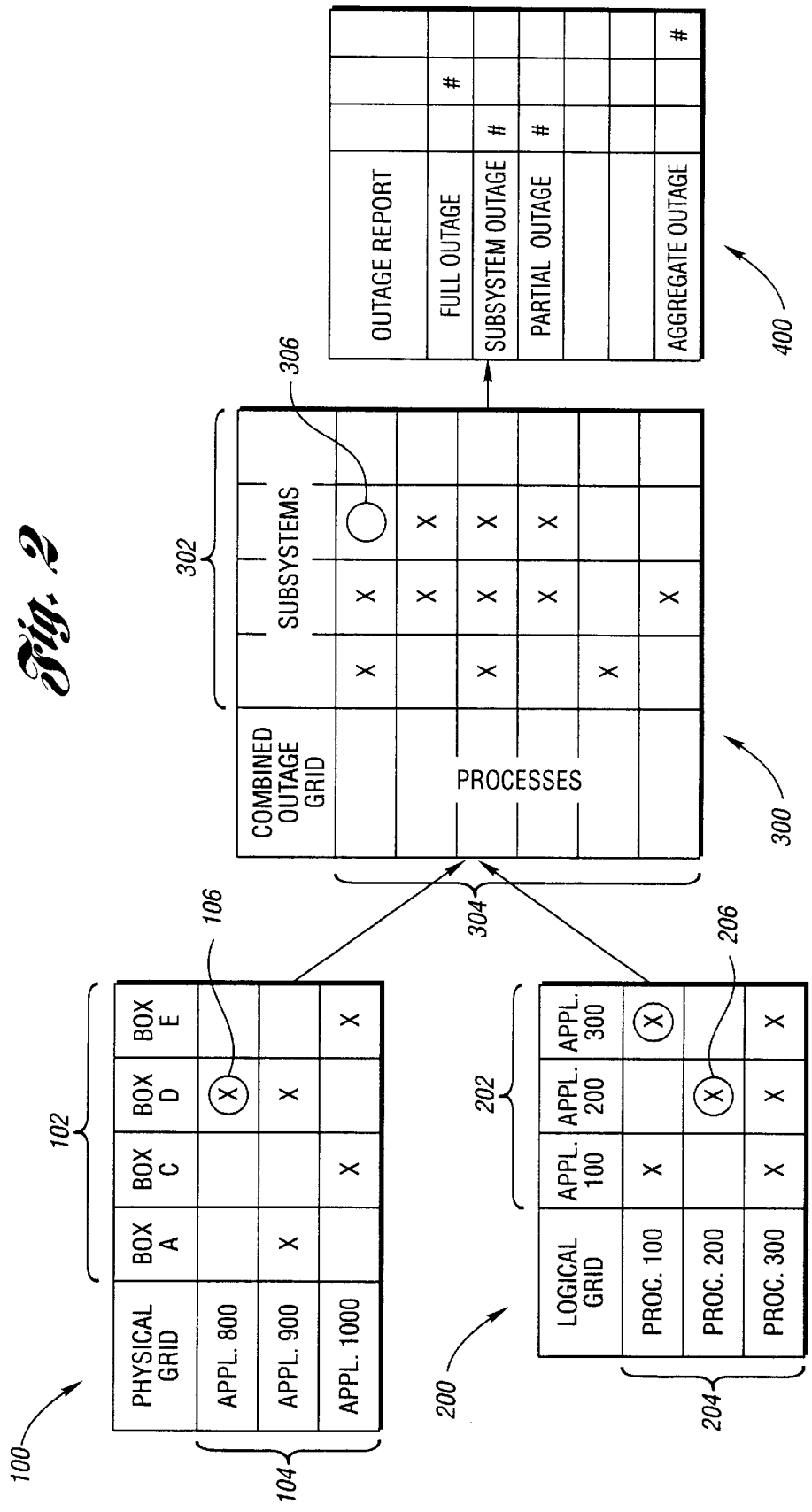
FIG. 2 is a block diagram illustrating the plurality of grids which are created for diagnosing a component failure within the mixed hardware and software system, according to the present invention.

Referring now to FIG. 2, a method for diagnosing and linking an outage to a specific application, process, and/or subsystem is illustrated in greater detail according to the present invention. A physical grid 100 is created and includes a plurality of entries along the top row 102 depicting each hardware component in system 10. For example, an entry may include a computer, a computer network, a network rotor, and the like. In the first column 104 the various software applications which utilize the hardware listed in row 102 are entered. The interdependency of applications 104 and hardware components 102 is readily apparent by the intersection of the rows with the columns and vice versa, for example as illustrated at cell 106 of the physical grid 100.

With continuing reference to FIG. 2, a logical grid 200 is shown illustrating the relationship between various software applications of system 10, and a plurality of processes, according to the present invention. Logical grid 200 includes entries along the first row 202 for each software application within system 10 and entries in column 204 for each process running within system 10. Again, as with the physical grid the dependency of an application on a process or a plurality of processes is indicated at the intersection of a column with a row (application process), as shown at cell 206.

A combined outage grid 300 is created by synthesizing the interdependency information from the physical grid 100 and logical grid 200. Combined outage grid 300 includes entries for each subsystem contained within system 10 along a top row 302. Further, processes are listed along a first column 304. As with physical grid 100 and logical grid 200 the interdependence of subsystems and processes are readily apparent. For example, interior cells 306 indicate which subsystems depend on which processes and vice versa. Combined outage grid 300 may be used to understand which processes are critical and their effect on various subsystems and vice versa.

According to the present invention, an outage report 400, for example, may be generated to indicate the level of the outage and what subsystems and processes were affected. For example, outages may be categorized into three levels. The first level, for example, may be called a full outage which is a systemic failure of all subsystems. A second level of system outage may be a subsystem outage with is a systemic failure of one or several subsystems. And finally a third level may be a process outage which is a partial functional degradation of one or several subsystems. Additionally, the outage report 400 may contain a weighted number which may be comprised of actual minutes of downtime, value or criticality of the process or subsystem, a rating factor and a timing factor.

Figure 3:
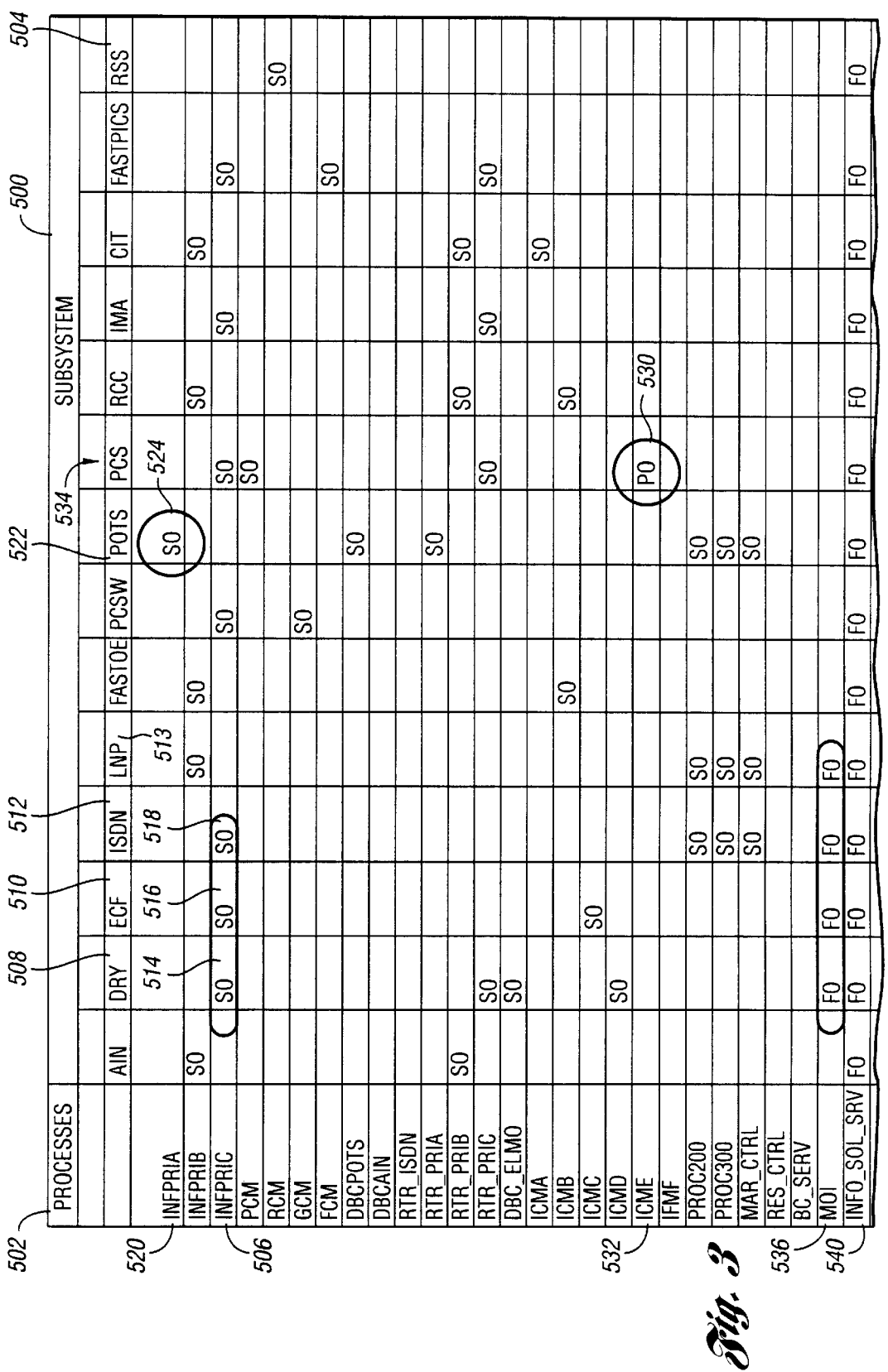
FIG. 3 is a perspective view of a combined subsystem by process grid used to determine the impact of a component failure within the mixed hardware and software system, according to the present invention.

Referring now to FIG. 3, an example of a combined subsystem by process grid 500 is illustrated, according to the present invention. Combine subsystem by process grid 500 further details the effect a particular subsystem or process outage has on other subsystems and processes. Again, processes are listed in column 502 while subsystems are listed in row 504. The processes and subsystems shown are indicated by acronyms which are included for explanatory purposes only and it is understood that any process and subsystem may be monitored and used in grid 500. For example, process 506 may cause multiple subsystem failures if process 506 fails. As shown in FIG. 3, for example, subsystems 508, 510 and 512 will fail as indicated by an entry of SO (subsystem outage) in cells 514, 516 and 518 if process 506 fails. In contrast, a failure of process 520 would cause only a single subsystem 522 to fail as indicated by cell 524. A subsystem failure results in the subsystem no longer being available to an end user.

FIG. 3, a process outage is illustrated, according to the present invention. Process outage 530 occurs when a process fails, for example, as shown the failure of process 532 results in a process outage of subsystem 534. However, failure of process 536 may result in a process outage for multiple subsystems, for example, as shown subsystems 508, 510 and 512, and 513 will experience a process outage. The process failures as indicated cause a partial functional degradation of the subsystems. The result is that the subsystems are missing some level of functionality. For example, an end user may not be able to complete a work task.

Finally, some process failures can cause a complete subsystem failure as illustrated in FIG. 3, according to the present invention. For example, a failure of process 540 causes all the subsystems using process 540 to fail, as shown in FIG. 3. If all the subsystems in system 10 require process 540 the failure of process 540 causes the entire system 10 to fail as indicated by an entry of FO (full outage) in the grid cells. The result is that the entire system 10 is no longer available to the end user.

Reference is now made to FIG. 4, which is an exemplary combined weighted grid, according to the present invention. The configuration of the combined weighted grid 600 is similar to the grids described previously. For example, processes are listed in the first column 602 while subsystems are listed in the first row 604. Weight values are shown in each cell, for example, cell 606, 608 and 610. Some outages carry more weight and/or value than others, as illustrated by the different values contained within cells 606, 608 and 610. Time is a hidden but important factor in weighting. Critical operating windows must be known to balance the scales. The values are indicative of the importance of a particular process or subsystem and its interdependency on other processes and subsystems. The weighted minutes may be calculated using the following equation:

$$\text{Weighted Minutes} = AM * V * W * T,$$

where AM is actual minutes the system is experiencing an outage; V is value; W is weight; and T is time.

Figure 5:
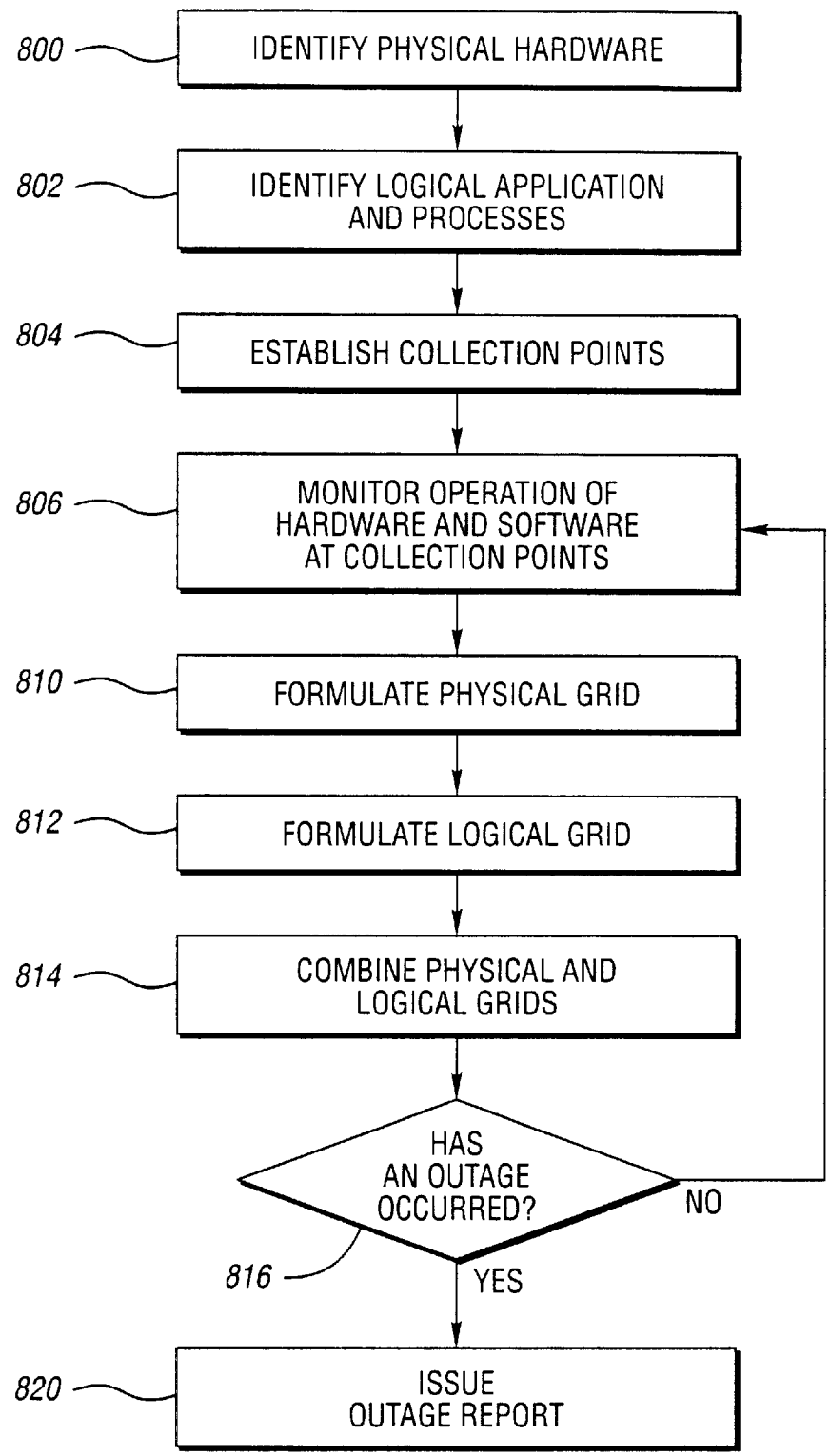
FIG. 5 is a flow diagram for a method of determining the impact of a component failure within the mixed hardware and software system, according to the present invention.

Reference is now made to FIG. 5, which illustrates a method for linking a system outage to a specific application, process, and/or subsystem, according to the present invention. The physical hardware included in the system such as cables, wiring, connectors, rotors, computers, and the like are identified, as represented by block 800. At block 802, the logical applications and processes are identified. Logical applications and processes may be software applications such as spreadsheets and databases and processes may include software functions used by the applications. Collection points are established at the various hardware subsystems, as well as the logical applications and processes to monitor for potential failures of same, as represented by block 804. At block 806, the operation of the hardware and software subsystems and processes are monitored. A physical subsystem grid is created at block 810 which identifies the relationship between the hardware subsystems and the applications running on a system. At block 812, a logical grid is formulated which identifies the relationship between applications running on a system and processes used by the applications. At block 814, the physical and logical grids are combined, and the resulting combined grid identifies the relationship between the hardware subsystems and the processes. At block 816, the system 10 according to the present invention determines whether an outage has occurred. If an outage has not occurred the system 10 continues to monitor the hardware and software processes, as represented by block 806. However, if an outage has occurred an outage report is issued which illustrates the subsystem and processes effected by the outage and the amount of time the subsystem has been effected, as represented by block 820.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for linking a performance of a mixed system to a system failure, the mixed system including a mixture of hardware and software, the method comprising:

identifying a plurality of physical hardware in the mixed system;

determining a plurality of software applications in the mixed system;

classifying a plurality of software processes in the mixed system;

establishing a plurality of collection points for monitoring the operation of each of the plurality of physical hardware, the plurality of software applications, and the plurality of software processes;

creating a physical grid wherein the physical grid indicates a relationship between the plurality of hardware and the plurality of software applications;

creating a logical grid wherein the logical grid indicates a relationship between the plurality of software applications and the plurality of software processes;

combining the physical and logical grids to obtain the relationship between the plurality of hardware and the plurality of software processes by associating each of the plurality of hardware with each of the plurality of software processes sharing a common software application; and utilizing the combined grid to link a loss in functionality to a physical hardware failure and a software process failure.

2. The method of claim 1 further comprising indicating a level of loss of system functionality in the combined grid.

3. The method of claim 1 further comprising issuing an outage report which indicates a level of loss in system functionality for a duration of weighted minutes.

4. The method of claim 3 further comprising calculating the weighted minutes using the equation:

$$\text{Weighted Minutes} = AM * V * W * T,$$

where

AM is actual minutes the system is experiencing an outage;

V is value;

W is weight; and

T is time.

5. A system for linking a performance of a mixed physical subsystem and software system to a system failure, the system comprising:

a plurality of physical subsystems in the mixed physical subsystem and software system;

a plurality of software applications in the mixed physical subsystem and software system;

a plurality of software processes in the mixed physical subsystem and software system;

a plurality of collection points for monitoring the operation of each of the plurality of physical subsystems, the plurality of software applications, and the plurality of software processes;

a physical grid wherein the physical grid indicates a relationship between the plurality of physical subsystems and the plurality of software applications;

a logical grid wherein the logical grid indicates a relationship between the plurality of software applications and the plurality of software processes; and a combined grid created by combining the physical and logical grids to obtain the relationship between the plurality of physical subsystems and the plurality of software processes, the relationship between each one of the plurality of physical subsystems and each one of the plurality of software processes based on both having at least one of the plurality of software applications in common, wherein the combined grid is used to link a loss in functionality to one of a physical subsystem failure and a software process failure.

6. The system of claim 5 wherein the combined grid indicates a level of loss of system functionality.

7. The system of claim 5 further comprising an outage report which indicates a level of loss in system functionality for a duration of weighted minutes.

8. The system of claim 7 further comprising calculating the weighted minutes using the equation:

$$\text{Weighted Minutes} = AM * V * W * T,$$

where

AM is actual minutes the system is experiencing an outage;

V is value;

W is weight; and

T is time.

* * * * *